(12) United States Patent
Wu et al.

(10) Patent No.: US 12,429,590 B2
(45) Date of Patent: Sep. 30, 2025

(54) PHOTONIC DOPPLER VELOCIMETRY (PDV) SYSTEM FOR ULTRA-HIGH-SPEED INSTANTANEOUS MEASUREMENT

(71) Applicant: Beijing Changcheng Institute of Metrology & Measurement, AVIC, Beijing (CN)

(72) Inventors: Tengfei Wu, Beijing (CN); Linjie Lv, Beijing (CN); Jibo Han, Beijing (CN); Chuanqing Xia, Beijing (CN)

(73) Assignee: Beijing Changcheng Institute of Metrology & Measurement, AVIC, Beijing (CN)

( * ) Notice: Subject to any disclaimer, the term of this patent is extended or adjusted under 35 U.S.C. 154(b) by 520 days.

(21) Appl. No.: 18/055,171

(22) Filed: Nov. 14, 2022

(65) Prior Publication Data

US 2023/0184945 A1 Jun. 15, 2023

(30) Foreign Application Priority Data

Dec. 13, 2021 (CN) .......................... 202111521758.6

(51) Int. Cl.
*G01S 17/58* (2006.01)
*G01S 7/481* (2006.01)

(52) U.S. Cl.
CPC ............ *G01S 17/58* (2013.01); *G01S 7/4814* (2013.01); *G01S 7/4818* (2013.01)

(58) Field of Classification Search
CPC ...... G01S 17/58; G01S 7/4814; G01S 7/4818; G01P 3/36; G01P 3/366
See application file for complete search history.

(56) References Cited

U.S. PATENT DOCUMENTS

| 2015/0236789 A1* | 8/2015 | Vahala | ...................... H03L 7/16 |
| | | | 398/192 |
| 2018/0113215 A1* | 4/2018 | Bennett | ................... G01S 17/32 |

FOREIGN PATENT DOCUMENTS

| CN | 103091072 A | * | 5/2013 | |
| CN | 205581300 U | | 9/2016 | |
| CN | 106896619 A | * | 6/2017 | ............... G02F 7/00 |
| CN | 109116371 A | | 1/2019 | |

OTHER PUBLICATIONS

Zhongyang et al. ("Multifunction Lidar System Based on Polarization-Division Multiplexing", Journal of Lightwave Technology, vol. 37, No. 9, May 1, 2019) (Year: 2019).*
Zhao et al. ("Time-Stretched Femtosecond Lidar Using Microwave Photonic Signal Processing", Journal of Lightwave Technology, vol. 38, No. 22, Nov. 15, 2020) (Year: 2020).*

* cited by examiner

*Primary Examiner* — Jennifer D Bennett

(57) ABSTRACT

Disclosed is a photonic doppler velocimetry (PDV) system for ultra-high-speed instantaneous measurement, relating to laser velocity interferometry. The PDV system includes a laser velocity interferometry module, a microwave photonic module, and a data acquisition and signal processing module. The laser velocity interferometry module includes a continuous-wave laser, a circulator, a fiber optic probe, and a first photodetector. The microwave photonic module includes a femtosecond-pulse laser, a first dispersion optical fiber, a second dispersion optical fiber, a Mach-Zehnder (M-Z) modulator, and an optical fiber amplifier. The data acquisition and signal processing module includes a second photodetector, an oscilloscope, and a computer.

6 Claims, 2 Drawing Sheets

PHOTONIC DOPPLER VELOCIMETRY (PDV) SYSTEM FOR ULTRA-HIGH-SPEED INSTANTANEOUS MEASUREMENT

CROSS-REFERENCE TO RELATED APPLICATIONS

This application claims the benefit of priority from Chinese Patent Application No. 202111521758.6, filed on Dec. 13, 2021. The content of the aforementioned application, including any intervening amendments thereto, is incorporated herein by reference in its entirety.

TECHNICAL FIELD

This application relates to velocity interferometry, and more particularly to a photonic doppler velocimetry (PDV) system for ultra-high-speed instantaneous measurement.

BACKGROUND

The photonic doppler velocimetry (PDV) has been widely used in dynamic high-pressure loading of flyers, space debris simulation, and test of dynamic mechanical properties of materials under high strain rate due to its advantages of non-contact measurement, low cost, simple operation, fast response, good metrological traceability, high frequency response, and excellent dynamic performance.

For a 1550 nm laser, a speed of 1 km/s will produce a doppler shift of 1.29 GHz, and the doppler shift signal of a moving object is directly proportional to the motion speed. In an ultra-high-speed instantaneous measurement scenario, the test target has an extremely large acceleration (typically from 0 to several kilometers/s or even tens of kilometers/s in a few microseconds or even several hundreds of nanoseconds). For example, in the velocity measurement of flyers driven by chemical explosions and high-power laser, the target can reach 10 km/s within a few tens of nanoseconds, which will generate a doppler shift signal of 12.9 GHz. However, the current commercially-available oscilloscopes only have a bandwidth of 5 GHz, which can hardly meet such high-speed dynamic performance test requirements. Therefore, the ordinary PDV system is limited in the dynamic velocimetry range due to the limitations in the bandwidth and sampling rate of the digital-to-analog conversion technology.

Regarding the microwave photonics-based time-stretched technology, its bandwidth is mainly limited by the input bandwidth of the electro-optic modulation. The existing lithium niobate M-Z electro-optic modulators generally have an input bandwidth of 40 GHz, so the dynamic velocity measurement range can be extended to 31 km/s, and the stretch factor can reach up to 40. In addition to the extension of the velocity measurement range and time resolution capability, for a target object with a velocity of 1-10 km/s, the measurement signal can be reduced to an electrical signal with a frequency of several hundred megahertz or even several tens of megahertz, facilitating the real-time measurement.

SUMMARY

An object of the present disclosure is to provide a photonic doppler velocimetry (PDV) system for ultra-high-speed instantaneous measurement to overcome the deficiencies in the prior art. The PDV system provided herein can detect doppler frequency shift signals produced by objects moving at a higher speed, reduce the doppler shift signals, and increase the time revolution proportionally.

Technical solutions of the present disclosure are described as follows.

In a first aspect, the present disclosure provides a photonic doppler velocimetry (PDV) system for ultra-high speed instantaneous measurement, comprising:
- a laser velocity interferometry module;
- a microwave photonic module; and
- a data acquisition and signal processing module;
- wherein the laser velocity interferometry module comprises a continuous wave laser, a circulator, a fiber optic probe, and a first photodetector; the continuous wave laser is connected to a first port of the circulator; a second port of the circulator is connected to the fiber optic probe; and a third port of the circulator is connected to the first photodetector;
- the microwave photonic module comprises a femtosecond-pulse laser, a first dispersion optical fiber, a second dispersion optical fiber, a Mach-Zehnder (M-Z) modulator, and an optical fiber amplifier; the femtosecond-pulse laser is connected to the first dispersion optical fiber; the first dispersion optical fiber is connected to the M-Z modulator; the M-Z modulator is connected to the second dispersion optical fiber; the second dispersion optical fiber is connected to the optical fiber amplifier;
- the data acquisition and signal processing module comprises a second photodetector, an oscilloscope, and a computer; the second photodetector is connected to the oscilloscope; the oscilloscope is connected to the computer; and
- the laser velocity interferometry module further comprises an electrical amplifier, an electrical filter and a power divider; the first photodetector is connected to the electrical amplifier; the electrical amplifier is connected to the electrical filter; the electrical filter is connected to the power divider; a 0° phase-shift electrical signal of the power divider is connected to a first port of the M-Z modulator, and a 90° phase-shift electrical signal of the power divider is connected to a second port of the M-Z modulator; and the optical fiber amplifier is connected to the second photodetector.

In some embodiments, the power divider is configured to divide an electrical signal of the electrical filter into the 0° phase-shift electrical signal and the 90° phase-shift electrical signal to be modulated on the M-Z modulator.

In some embodiments, the computer is configured to restore a velocity signal of a target object by using a time-frequency analysis algorithm, an energy ridge extraction algorithm, and a data splicing algorithm.

In some embodiments, the fiber optic probe is selected from the group consisting of a dual-fiber probe, a three-fiber probe, a micro-lens array probe, a multi-directional fiber optic probe, and an internal ballistic fiber optic probe.

In some embodiments, the first dispersion optical fiber and the second dispersion optical fiber are independently selected from the group consisting of a single-mode optical fiber, a dispersion-compensating optical fiber, a large dispersion photonic crystal fiber, a fiber Bragg grating, and an array waveguide grating.

In a second aspect, this application provides a method for operating the aforementioned PDV system, comprising:
subjecting optical signals emitted from the femtosecond-pulse laser to time-stretching by using the first dispersion optical fiber having a length of L1 such that the optical signals spread over a time domain entirely, and the optical signals varying in wavelength are continuously expanded with transmission time in one repetition cycle under the dispersion of the first dispersion optical fiber;

modulating, by the M-Z modulator, the optical signals to an output signal of the first dispersion optical fiber;

subjecting the output signal of the first dispersion optical fiber to modulation by using the M-Z modulator and time stretching by using the second dispersion optical fiber having a length of L2 such that a doppler shift signal is time-stretched and a frequency of the doppler shift signal is reduced;

wherein a scale factor M is defined, expressed as M=(L1+L2)/L1; the frequency of the doppler frequency shift signal is reduced to 1/M of an initial frequency of the doppler frequency shift signal such that for the same sampling interval, sampling time is increased by (M−1) times, so as to increase the number of sampling points and thus enhance temporal resolution by (M−1) times;

processing, by the electrical amplifier and the electrical filter, the doppler shift signal to obtain an electrical signal;

dividing, by the power divider, the electrical signal into the 0° phase-shift electrical signal and the 90° phase-shift electrical signal;

modulating the 0° phase-shift electrical signal at the first port of the M-Z modulator and the 90° phase-shift electrical signal at the second port of the M-Z modulator through single-side band modulation;

collecting, by the second photodetector and the oscilloscope, a time-stretched doppler shift signal; and separating, by the computer, the time-stretched doppler shift signal in a time-frequency domain by using a time-frequency analysis algorithm to eliminate signal aliasing; extracting, by the computer, segmented doppler shift signals by using an energy ridge extraction algorithm; and performing, by the computer, splicing on the segmented doppler shift signals by using a data splicing algorithm to restore a velocity signal, so as to complete the ultra-high-speed instantaneous measurement.

Compared to the prior art, the present disclosure has the following beneficial effects.

(1) The PDV system provided herein can improve the time resolution, reduce the frequency limit pressure of digital-to-analog conversion, and broaden the dynamic velocity measurement range.

(2) In the PDV system provided herein, the impact of the signal-to-noise ratio decline caused by the sampling clock jitter can be mitigated by time stretching since the error caused by the sampling clock jitter during the digital-to-analog conversion will decrease with the decrease of the signal conversion rate.

(3) In the microwave photonic module of the PDV system provided herein, the scale factor M is only dependent from the length of the two dispersion optical fibers, and the higher-order nonlinearity is eliminated, such that the power penalty can be effectively suppressed.

Figure 1:
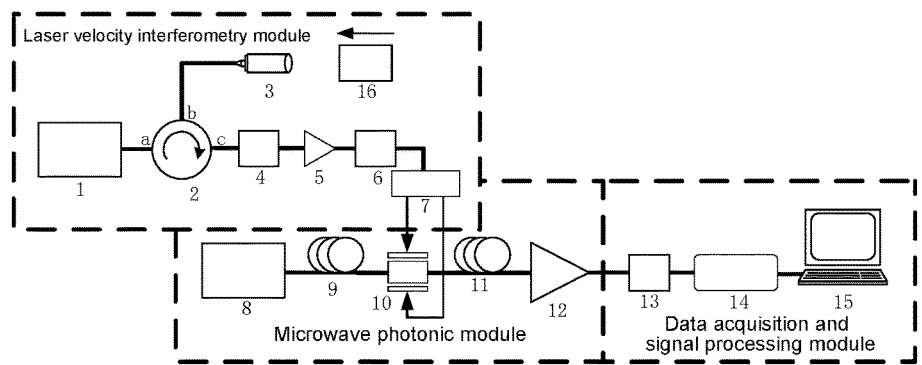
FIG. 1 structurally shows a photonic doppler velocimetry (PDV) system according to an embodiment of the present disclosure.

In the drawings, 1, continuous wave laser; 2, circulator; 3, fiber optic probe; 4, first photodetector; 5, electrical amplifier; 6, electrical filter; 7, power divider; 8, femtosecond-pulse laser; 9, first dispersion optical fiber; 10, Mach-Zehnder (M-Z) modulator; 11, second dispersion optical fiber; 12, erbium-doped fiber amplifier (EDFA); 13, second photodetector; 14, oscilloscope; and 15, computer.

DETAILED DESCRIPTION OF EMBODIMENTS

The present disclosure will be further described below with reference to the embodiments and accompanying drawings, which are not intended to limit the scope of the present disclosure.

Embodiment 1

An embodiment illustrated in FIG. 1 provides a photonic doppler velocimetry (PDV) system for ultra-high-speed instantaneous measurement, which includes a laser velocity interferometry module, a microwave photonic module, and a data acquisition and signal processing module. The laser velocity interferometry module includes a continuous wave laser 1, a circulator 2, a fiber optic probe 3, and a first photodetector 4. The microwave photonic module includes a femtosecond-pulse laser 8, a first dispersion optical fiber 9, a second dispersion optical fiber 11, a Mach-Zehnder (M-Z) modulator 10, and an erbium-doped fiber amplifier (EDFA) 12. The data acquisition and signal processing module includes a second photodetector 13, an oscilloscope 14, and a computer 15. The continuous wave laser 1 generates light that passes through the three-port circulator 2 to reach the fiber optic probe 3. A part of the light that is directly reflected back is defined as the reference light, and the other part of the light that reaches the surface of a moving object 16 is collected by the fiber optic probe 3 and returned to the optical system is defined as the signal light. The reference light and the signal light are mixed and then pass through the first photodetector 4. Due to the square effect of the first photodetector 4, the beat frequency signal between the signal light and the reference light is detected as a doppler frequency shift signal. Then, the doppler frequency shift signal is processed by the electrical amplifier 5 and the electrical filter 6 to reach the power divider 7. At the same time, the femtosecond-pulse laser 8 generates femtosecond pulses that pass through the first dispersion optical fiber 9 to produce chirped pulses that are modulated by the M-Z modulator 10, so that the doppler frequency shift signal is modulated to the chirped pulses. Then the doppler frequency shift signal is subjected to time stretching by the second dispersion optical fiber 11 to reduce the doppler frequency shift signal and improve the time resolution. Finally, the doppler frequency shift signal is acquired by the oscilloscope 14, and subjected to the time-frequency domain separation and splicing restoration on the computer 15.

In an embodiment, the power divider 7 is configured to divide an electrical signal of the electrical filter into the 0° phase-shift electrical signal and the 90° phase-shift electrical signal to be modulated on the M-Z modulator.

In an embodiment, the computer 15 is configured to restore a velocity signal of a target object by using a time-frequency analysis algorithm, an energy ridge extraction algorithm, and a data splicing algorithm.

In an embodiment, the fiber optic probe 3 is selected from the group consisting of a dual-fiber probe, a three-fiber probe, a micro-lens array probe, a multi-directional fiber optic probe, and an internal ballistic fiber optic probe.

In an embodiment, the first dispersion optical fiber 9 and the second dispersion optical fiber 11 are independently selected from the group consisting of a single-mode optical fiber, a dispersion-compensating optical fiber, a large dispersion photonic crystal fiber, a fiber Bragg grating, and an array waveguide grating.

In an embodiment, a doppler beat signal is generated by external differential interference of an ordinary PDV system, and is continuous in a time domain under the continuous laser. According to the law of photoelectric conversion, the photocurrent outputted from the first photodetector 4 is proportional to the incident average optical power, that is, the photocurrent outputted from the first photodetector 4 is proportional to the square of the photoelectric field intensity. The interference light intensity detected through the first photodetector 4 after the superposition of reference light and signal light is expressed as:

$$I = I_1 + I_2 + 2\sqrt{I_1 I_2} \cos[4\pi/\lambda \mu(t) \cdot t \cdot \cos\theta + (\varphi_1 - \varphi_2)] \quad (1);$$

where θ represents an angle between an axial direction of the light probe and a moving direction of a target object; $I_1$ represents the intensity of the reference light; $I_2$ represents the intensity of the signal light; the moving speed of the target object is μ(t); and $\varphi_1$ and $\varphi_2$ represent the initial phase of the reference light and signal light, respectively.

The beat frequency signal detected by the first photodetector 4 is the difference between the frequencies of the reference light and the signal light, expressed as:

$$\Delta f = \frac{\omega_1 - \omega_2}{2\pi} \cdot \cos\theta = \frac{2}{\lambda} \cdot \mu(t) \cdot \cos\theta; \quad (2)$$

where μ represents the moving speed of the target object; and λ represents a wavelength of detection light.

Figure 2:
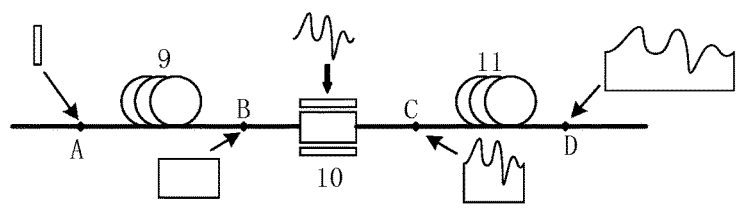
FIG. 2 schematically shows principles of time stretching in a microwave photonic module of the PDV system according to an embodiment of the present disclosure.

As shown in FIG. 2, optical signals transmitted from the femtosecond-pulse laser 9 are subjected to a primary time-stretching by the first dispersion optical fiber 9 having a length of L1 such that the optical signals spread over the time domain entirely, and the optical signals varying in wavelength are continuously expanded with transmission time in one repetition cycle due to a dispersion effect of the first dispersion optical fiber 9. The optical signals are modulated by the M-Z modulator 10 to a chirped output signal of the first dispersion optical fiber 9, and are subjected to a secondary time-stretching by the second dispersion optical fiber 11 having a length of L2 such that a doppler frequency shift signal is also time-stretched and its frequency is reduced. As can be seen from FIG. 2, the time stretching ratio is the ratio of the time lengths of point D to that of point C, that is, it depends on the total dispersion value of the dispersion medium at both ends, and the scaling factor is expressed as:

$$M = \frac{D_1 + D_2}{D_1}; \quad (3)$$

where $D_1$ and $D_2$ represent the total dispersion of the fiber at both ends, respectively. Since the same fiber is used as the dispersion medium, formula (3) can be expressed as:

$$M = (L1 + L2)/L1 \quad (4).$$

ΦDIP is the phase due to dispersion, and the envelope $I_{Env}$ formed by the optical pulse spreading under a small modulation depth (modulation factor m<<1) is expressed as:

$$\varphi_{DIP} = \frac{1}{2}\beta_2\left(\frac{L_2}{M}\right)\omega_{RF}^2; \quad (5)$$

$$I(t) = I_{Env} \times \left[1 - m\cos\varphi_{DIP}\cos\frac{\omega_{RF}}{M}t + \frac{m^2}{8}(1 - \cos 4\varphi_{DIP})\cos 2\frac{\omega_{RF}}{M}t + \frac{m^3}{96}(\cos 9\varphi_{DIP} + 3\cos 3\varphi_{DIP})\cos 2\frac{\omega_{RF}}{M}t + ...\right]; \quad (6)$$

where $\omega_{RF}$ represents the frequency of a to-be-processed analog electrical signal; M represents the scaling factor; $\beta_2$ represents the second-order group velocity dispersion parameter; and $L_2$ represents the length of the second dispersion optical fiber.

It can be seen from formula (5) that in the case of a determined time-stretching analog-to-digital converter (that is, $L_2$, $\beta_2$, and M are determined), $\varphi_{DIP}$ is only related to the frequency of the to-be-processed analog signal. Combined with formula (6), for different frequencies of the to-be-processed analog signal, the amplitude of the time-stretching signal will change, namely, it will produce the power cost, which will reduce the effectiveness of the time-stretching analog-to-digital converter operation.

The doppler frequency shift signal is processed by the electrical amplifier 5 and the electrical filter 6 to obtain a processed electrical signal. The processed electrical signal is divided into a 0° phase-shift electrical signal and a 90° phase-shift electrical signal by the power divider through single-side band modulation, and modulated on the M-Z modulator, which can effectively suppress the power penalty. Through the single-side band modulation, the formula (6) can be rewritten as:

$$I(t) = I_{Env} \times \left[1 - \frac{m}{\sqrt{2}}\cos\left(\frac{\omega_{RF}}{M}t - \varphi_{DIP} + \frac{\pi}{4}\right) + \frac{m^2}{8}\sin 4\varphi_{DIP}\cos 2\frac{\omega_{RF}}{M}t + \frac{\sqrt{2}m^3}{192}\cos\left(3\frac{\omega_{RF}}{M}t + 9\varphi_{DIP} - \frac{\pi}{4}\right) - \frac{\sqrt{2}m^3}{128}\cos\left(3\frac{\omega_{RF}}{M}t - 3\varphi_{DIP} + \frac{\pi}{4}\right) + ...\right]. \quad (7)$$

Although the single-side band modulation removes a factor cos $\varphi_{DIP}$ causing the power cost, at the same time it causes a phase change $-\varphi_{DIP}+\pi/4$ of a to-be processed signal. As $-\varphi_{DIP}$ relates to a bandwidth of an input analog signal, it can will produce frequency-dependent phase shift, resulting in signal overlap and distortion, which can be corrected by using a phase correction algorithm in a digital domain.

Figure 3:
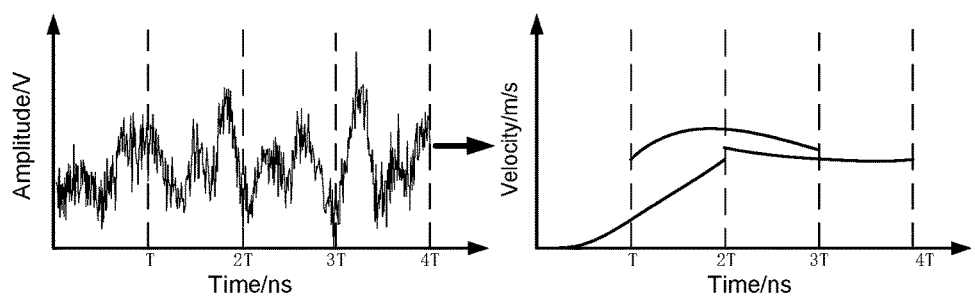
FIG. 3 schematically shows time-frequency analysis results of aliased signals according to an embodiment of the present disclosure.
Figure 4:
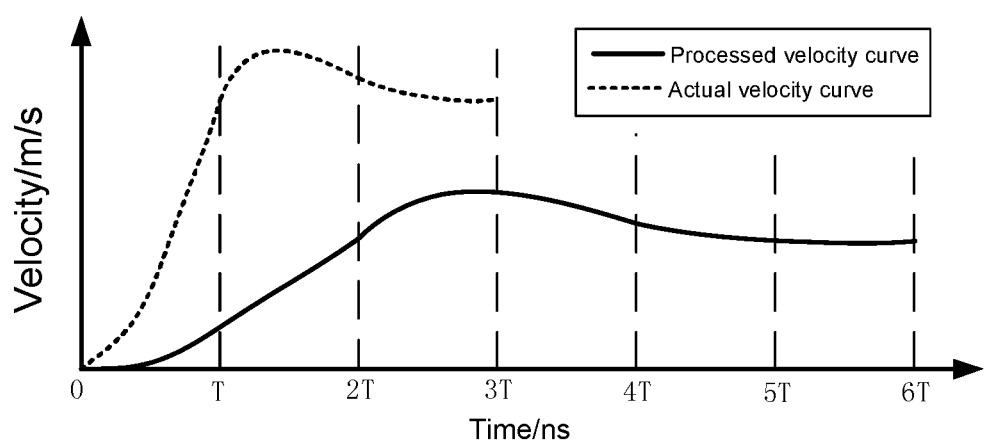
FIG. 4 schematically show splicing of segmented signals according to an embodiment of the present disclosure.

The time-domain signal acquired by the high-speed oscilloscope is converted to the time-frequency domain by using a short-time Fourier transform algorithm. As shown in FIG. 3, the doppler frequency shift signal is separated independently in the time-frequency domain within each pulse period T. The time-frequency energy map is segmented by using an image processing algorithm to extract the regional skeletons, and the separated skeletons are stitched into a velocity curve by translation (as shown in FIG. 4). In FIG. 4, the dashed line indicates the original velocity signal obtained by direct measurement, and the solid line indicates the velocity profile after microwave photon processing and data acquisition and signal processing. With a scaling factor M=2, the signal is attenuated by half, and is stretched to two times in the time domain, such that the number of sampling points is doubled, and the time resolution capability is also doubled.

Described above are merely illustrative of objects, technical solutions and beneficial effects of the present disclosure, which are not intended to limit the present disclosure. It should be understood that any modification, replacement, and improvement made by those skilled in the art without departing from the spirit and scope of the present disclosure shall fall in the scope of the present disclosure defined by the appended claims.

What is claimed is:

1. A photonic doppler velocimetry (PDV) system for ultra-high-speed instantaneous measurement, comprising:
    a laser velocity interferometry module;
    a microwave photonic module; and
    a data acquisition and signal processing module;
    wherein the laser velocity interferometry module comprises a continuous wave laser, a circulator, a fiber optic probe, and a first photodetector; the continuous wave laser is connected to a first port of the circulator; a second port of the circulator is connected to the fiber optic probe; and a third port of the circulator is connected to the first photodetector;
    the microwave photonic module comprises a femtosecond-pulse laser, a first dispersion optical fiber, a second dispersion optical fiber, a Mach-Zehnder (M-Z) modulator, and an optical fiber amplifier; the femtosecond-pulse laser is connected to the first dispersion optical fiber; the first dispersion optical fiber is connected to the M-Z modulator; the M-Z modulator is connected to the second dispersion optical fiber; the second dispersion optical fiber is connected to the optical fiber amplifier;
    the data acquisition and signal processing module comprises a second photodetector, an oscilloscope, and a computer; the second photodetector is connected to the oscilloscope; the oscilloscope is connected to the computer; and
    the laser velocity interferometry module further comprises an electrical amplifier, an electrical filter and a power divider; the first photodetector is connected to the electrical amplifier; the electrical amplifier is connected to the electrical filter; the electrical filter is connected to the power divider; a 0° phase-shift electrical signal of the power divider is connected to a first port of the M-Z modulator, and a 90° phase-shift electrical signal of the power divider is connected to a second port of the M-Z modulator; and the optical fiber amplifier is connected to the second photodetector.

2. The PDV system of claim 1, wherein the power divider is configured to divide an electrical signal of the electrical filter into the 0° phase-shift electrical signal and the 90° phase-shift electrical signal to be modulated on the M-Z modulator.

3. The PDV system of claim 1, wherein the computer is configured to restore a velocity signal of a target object by using a time-frequency analysis algorithm, an energy ridge extraction algorithm, and a data splicing algorithm.

4. The PDV system of claim 1, wherein the fiber optic probe is selected from the group consisting of a dual-fiber probe, a three-fiber probe, a micro-lens array probe, a multi-directional fiber optic probe, and an interior ballistic fiber probe.

5. The PDV system of claim 1, wherein the first dispersion optical fiber and the second dispersion optical fiber are independently selected from the group consisting of a single-mode optical fiber, a dispersion-compensating optical fiber, a photonic crystal fiber, a fiber Bragg grating, and an array waveguide grating.

6. A method for operating the PDV system of claim 1, comprising:
    subjecting optical signals emitted from the femtosecond-pulse laser to time-stretching by using the first dispersion optical fiber having a length of L1 such that the optical signals spread over a time domain entirely, and the optical signals varying in wavelength are continuously expanded with transmission time in one repetition cycle under the dispersion of the first dispersion optical fiber;
    modulating, by the M-Z modulator, the optical signals to an output signal of the first dispersion optical fiber;
    subjecting the output signal of the first dispersion optical fiber modulation by using the M-Z modulator and then to time stretching by using the second dispersion optical fiber having a length of L2 such that a doppler shift signal is time-stretched and a frequency of the doppler shift signal is reduced;
        wherein a scale factor M is defined, expressed as M=(L1+L2)/L1; the frequency of the doppler frequency shift signal is reduced to 1/M of an initial frequency of the doppler frequency shift signal such that for the same sampling interval, sampling time is increased by (M−1) times, so as to increase the number of sampling points and thus enhance temporal resolution by (M−1) times;
    processing, by the electrical amplifier and the electrical filter, the doppler shift signal to obtain an electrical signal;
    dividing, by the power divider, the electrical signal into the 0° phase-shift electrical signal and the 90° phase-shift electrical signal;
    modulating the 0° phase-shift electrical signal at the first port of the M-Z modulator and the 90° phase-shift electrical signal at the second port of the M-Z modulator through single-side band modulation;
    collecting, by the second photodetector and the oscilloscope, a time-stretched doppler shift signal; and
    separating, by the computer, the time-stretched doppler shift signal in a time-frequency domain by using a time-frequency analysis algorithm to eliminate signal aliasing; extracting, by the computer, segmented doppler shift signals by using an energy ridge extraction algorithm; and performing, by the computer, splicing on the segmented doppler shift signals by using a data splicing algorithm to restore a velocity signal, so as to complete the ultra-high-speed instantaneous measurement.

* * * * *